United States Patent
Tamai et al.

[11] Patent Number: 5,883,869
[45] Date of Patent: Mar. 16, 1999

[54] OPTICAL DISC READING DEVICE

[75] Inventors: Kazushi Tamai; Hisashi Hirano, both of Hamamatsu, Japan

[73] Assignee: Yamaha Corporation, Hamamatsu, Japan

[21] Appl. No.: 968,173

[22] Filed: Nov. 12, 1997

[30] Foreign Application Priority Data

Nov. 15, 1996 [JP] Japan ..................................... 8-305130

[51] Int. Cl.$^6$ ....................................................... G11B 7/00
[52] U.S. Cl. .................. 369/59; 369/58; 369/47
[58] Field of Search ................................ 369/59, 58, 47, 369/48, 49, 50, 54, 32, 124; 360/48, 51, 53

[56] References Cited

U.S. PATENT DOCUMENTS 5,363,362  11/1994  Maeda et al. ......................... 369/59 X
5,590,108  12/1996  Mitsuno et al. ......................... 369/59

Primary Examiner—Muhammad N. Edun
Attorney, Agent, or Firm—Loeb & Loeb LLP

[57] ABSTRACT

An optical disc reading device successively reads out data from an optical disc where the data are recorded on a packet-by-packet basis in such a manner that a link block is formed as a written-data gap between every adjoining packets. The data read out from the optical disc are decoded and subjected to an error detecting and correcting operation block by block. The blocks decoded and subjected to the error detecting and correcting operation are then sequentially stored into a data buffer. When a non-correctable error is found in a specific one of the blocks stored in the data buffer, the data reading section is controlled to continue the successive data readout from the optical disc if the specific block having the non-correctable error is a link block. But, if the specific block is not a link block, it is invalidated and the data reading section is controlled to stop the successive data readout from the optical disc. This arrangement effectively avoids degradation in reading performance even when an error occurs in a link block during advance readout of the data written on the packet-by-packet basis.

3 Claims, 4 Drawing Sheets

OPTICAL DISC READING DEVICE

BACKGROUND OF THE INVENTION

The present invention relates generally to devices for reading data from an optical disc, such as a CD-R (Compact Disc-Recordable) or DVD (Digital Video Disc-Recordable) where data are recorded on a packet-by-packet basis, and it relates more particularly to an improved optical disc reading device which can provide enhanced data reading performance by use of advance data readout.

Examples of the conventionally-known methods for recording data on a CD-R optical disc include the "disc-at-once" method in which data for the whole disc are recorded in succession by a single recording operation and the "track-at-once" method which allows a plurality of sessions to be written onto a disc in an additive fashion (additive writing). All of these recording methods, however, involve recording of a great quantity of data per recording operation, consuming a managing memory area of 10 to 20 megabytes per recording operation. Thus, the known recording methods are not suited to applications where a relatively small quantity of data are written a plurality of times in an additive fashion. In contrast, the so-called "packet-write" recording method, in which a small quantity of data are written onto an optical disc on a packet-by-packet basis, has the advantage that any necessary file can be additively written in much the same way as normally done on conventional hard discs, and hence it has been becoming increasingly popular in applications where a CD-R is used as an external storage device for a computer.

FIG. 5 is a diagram illustrating a recording format based on the packet-write recording method. Each track is composed of a pre-gap, which is a managing area provided at the head of the track, and a plurality of packets following the pre-gap. In this format, data are written on a packet-by-packet basis; that is, each new packet is written onto the optical disc, following an already-written packet. For this purpose, the pre-gap contains track descriptors, and a specific position to record a new packet is determined by reference to position information of a last-written packet on the disc. In additively writing a new packet, it is impossible to physically link the new packet with the preceding already-written packet in a continuous manner, so that a practically unreadable block called a "link block" is provided between every adjoining packets. Link information called a "splice" is stored in a data link period between the packets. The splice comprises information stored in a total of seven blocks: run-out information (Run-out) stored in two blocks at the end of the preceding packet; link information (Link) stored in one block at the head of the new or succeeding packet; and run-in information (Run-in) stored in four blocks of the succeeding packet.

The packet length is generally set by an external host computer. Because each packet comprises a plurality of blocks (sectors) each having a length of about 2K bytes, the packet length may be determined using 2K-byte units in principle. However, due to the splice consuming a total of 14K bytes, the recording area can not be used efficiently if the packet length is too short. For this reason, the packet length is normally set to 64K bytes, 128 bytes or the like so that that the effective use rate of the recording area exceeds 80 per cent.

In cases where a host computer reads out data from a CD, the data are often read out in a successive manner. Thus, conventional optical disc reading devices, such as CD-ROM drive devices, are often designed to continue the data readout operation, even after having read out data within a designated area, in order to read in advance the following data into an internal data buffer. This advance data readout into the internal data buffer would achieve enhanced data reading performance for next access from the host computer.

However, if the data written on the packet-by-packet basis are readout successively for the purpose of advance data readout, a non-correctable error could occur in the link block that is a written-data gap between adjoining packets, as noted earlier. In such a case, a seek-track operation is retried on the same portion a plurality of times and the data readout operation would be disabled after all. As a result, the advance data readout has to be halted, which would unavoidably lead to considerable degradation in the reading performance.

SUMMARY OF THE INVENTION

Therefore, it is a primary object of the present invention to provide an optical disc reading device which can effectively avoid degradation in the reading performance even when an error occurs in a link block between packets during advance readout of data written on a packet-by-packet basis.

According to a primary aspect of the present invention, there is provided an optical disc reading device which comprises: a data reading section that successively reads out data from an optical disc where the data are recorded on a packet-by-packet basis in such a manner that a link block is formed as a written-data gap between every adjoining packets, each of the packets being of a predetermined data length and including a plurality of blocks; a decoding section that decodes the data read out from the optical disc and performs an error detecting and correcting operation on each of the blocks; a data buffer that sequentially stores each of the blocks decoded and subjected to the error detecting and correcting operation by the decoding section; and a control section that, when a non-correctable error is found in a specific one of the blocks stored in the data buffer, controls the data reading section to continue successively reading out the data from the optical disc if the specific block having the non-correctable error is a link block, but invalidates the specific block and controls the data reading section to stop successively reading out the data from the optical disc if the specific block is not a link block.

In this optical disc reading device, even when a non-correctable error occurs during advance data readout into the data buffer, the advance data readout is continued as long as the data block having the error is a link block between the packets. This arrangement avoids degradation in reading performance and prevents erroneous data from being supplied outside the disc reading device, because an external host computer does not read data between packets in normal operations although the data of the erroneous block are stored into the data buffer.

In a preferred implementation, the optical disc reading device further comprises a read-error managing table to manage a stored position, in the data buffer, of the specific block having the non-correctable error. Preferably, when a data readout request is received from outside, the control section refers to the read-error managing table so as to prevent the data reading section from reading out the specific block. By thus positively managing the stored position of the specific block and inhibiting readout of the erroneous data, the erroneous data can be reliably prevented from being read out to the host computer even when a data readout request for the specific block is exceptionally received from outside.

BRIEF DESCRIPTION OF THE DRAWINGS

Preferred embodiments of the present invention will now be described with reference to the accompaniment drawings, in which.

DETAILED DESCRIPTION OF THE PREFERRED EMBODIMENTS

Figure 1:
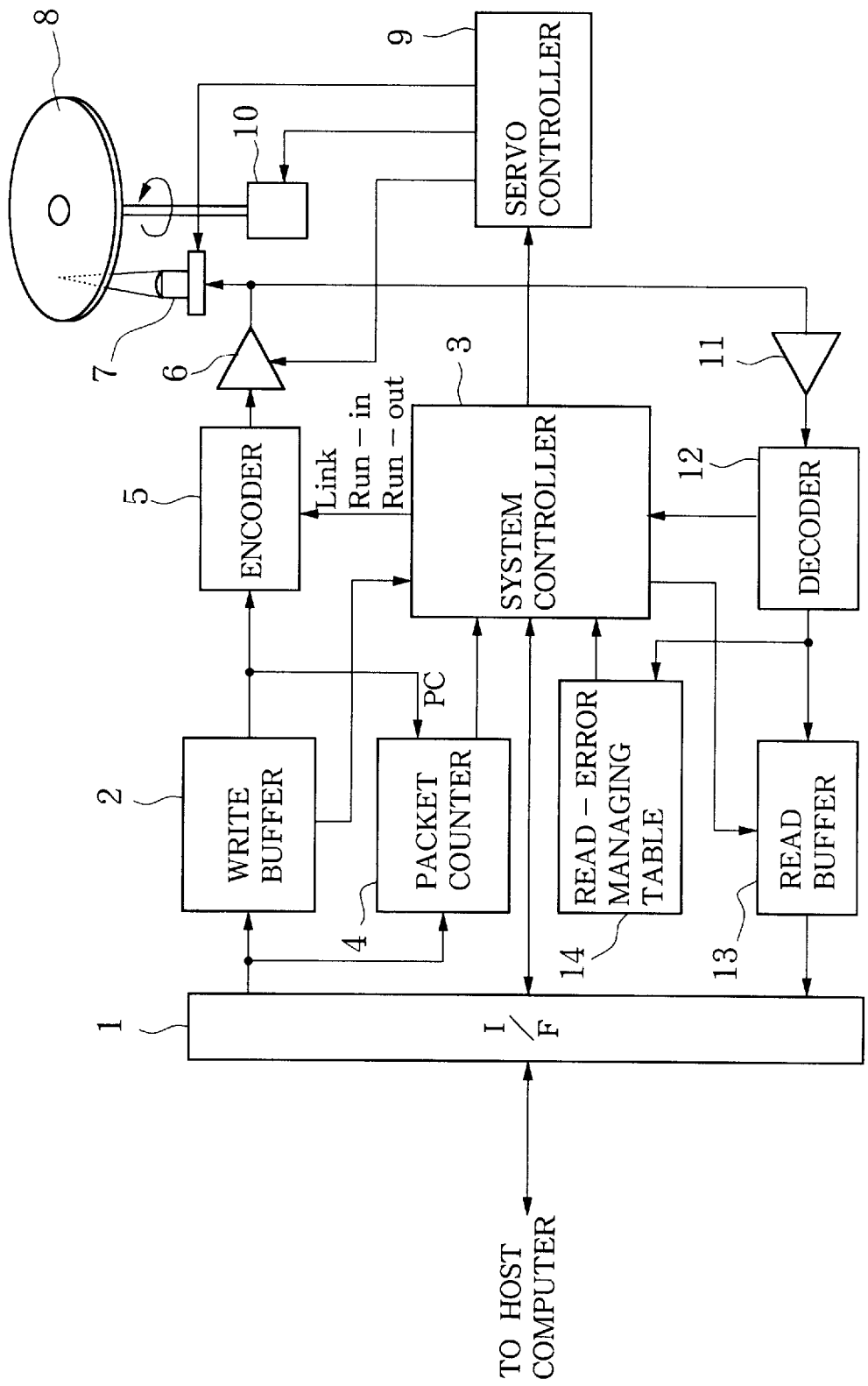
FIG. 1 is a block diagram illustrating a general setup of a CD-R drive device in accordance with a preferred embodiment of the present invention.

FIG. 1 is a block diagram illustrating a general setup of a CD-R (Compact Disc-Recordable) drive device in accordance with a preferred embodiment of the present invention.

Data of a file to be recorded, supplied packet by packet from a host computer, are stored via an interface 1 into a write buffer (data buffer) 2 having a storage capacity for a plurality of packets, and the stored data are read out from the write buffer 2 under the control of a system controller 3. Each of the packets stored in the write buffer 2 includes, at its beginning and end, identifiers indicative of the start and end of the packet. In response to the identifiers, a packet counter 4 increments by one each time one packet is stored into the write buffer 2 and decrements by one each time one packet is read out from the write buffer 2. This way, the packet counter 4 constantly holds the number of packets PC currently stored in the write buffer 2.

The system controller 3 control data input and output to and from the write buffer 2 on the basis of the number of currently-stored packets PC and commands from the host computer. Data read out from the write buffer 2 are fed to an encoder 5, which converts the fed data into a predetermined recording format on the packet- by-packet basis. Specifically, the fed data are imparted ECC (Error Correction Code)/EDC (Error Detection Code) block by block (sector by sector), sector-interleaved as necessary, imparted splices such as link, run-in and run-out information given from the system controller 3, and EFM (Eight to Fourteen Modulation)-modulated, to thereby provide data to be written (or write data).

The write data output from the encoder 5 are then delivered via an amplifier 6 to an optical head 7, which, using the delivered write data, modulates the power of a laser light beam so as to form pits in an optical disc 8. In accordance with instructions given from the system controller 3, a servo controller 9 controls the laser power amplification by the amplifier 6, the seek operation of the optical head 7 and the revolution of a spindle motor 10 rotating the optical disc 8.

Data read out from the optical disc 8 by means of the optical head 7 are fed via an amplifier 11 to a decoder 12. In the decoder 12, the fed data are EFM-demodulated, de-interleaved as necessary, subjected, block by block, to an error detection/correction operation using the ECC/EDC, and then stored into a read buffer 13. When an error block is read out, the system controller 3, as a rule, invalidates the error block and stops the data reading operation. If the error block is a link block, then the system controller 3 continues the data read into the read buffer 13 and registers in a read-error managing table 14 such data indicating that the read-out block is an error block. In response to a data readout request from the host computer, the data thus stored in the read buffer 13 are read out and supplied to the host computer via the interface 1.

Now, a description will be made about successive data readout by the CD-R drive device.

Figure 2:
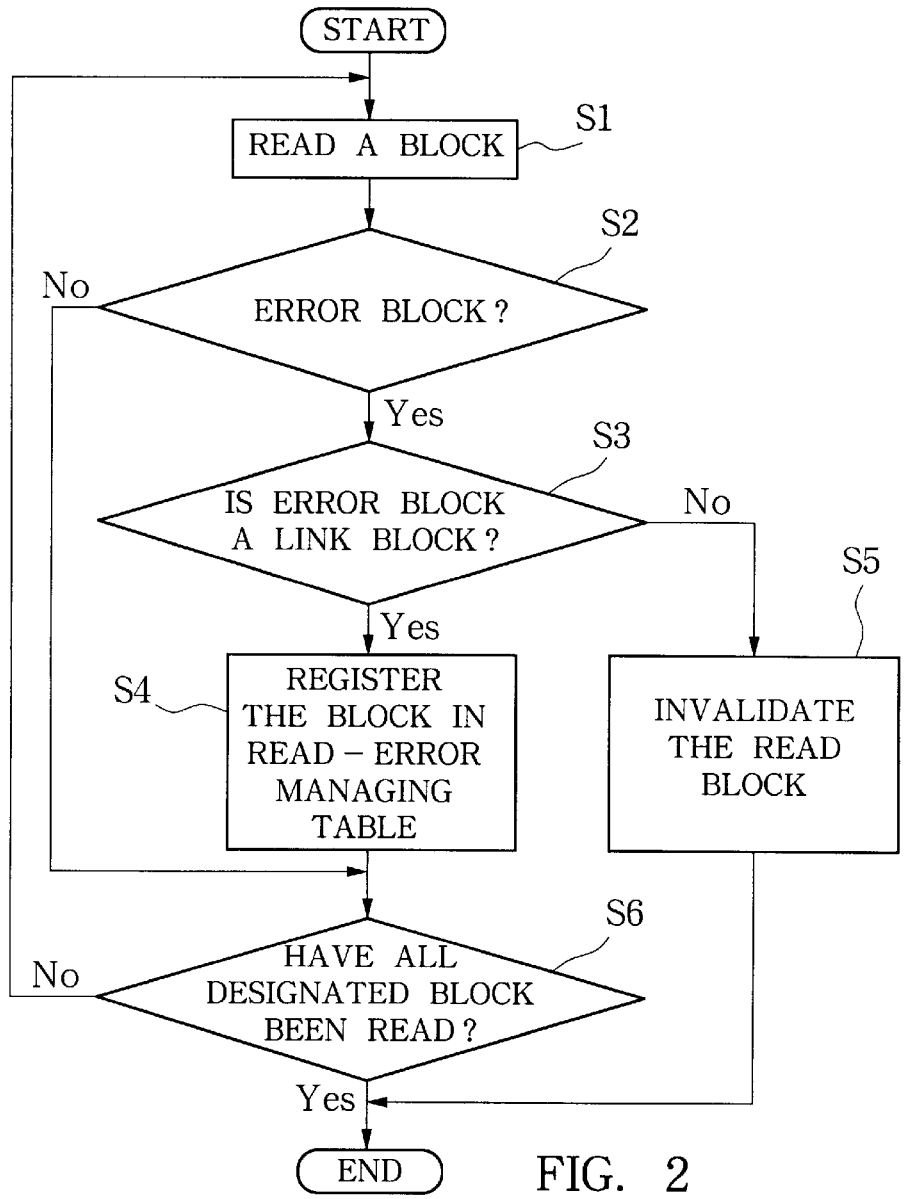
FIG. 2 is a flowchart showing typical behavior of a system controller of FIG. 1 during successive data readout in the CD-R drive device.
Figure 3:
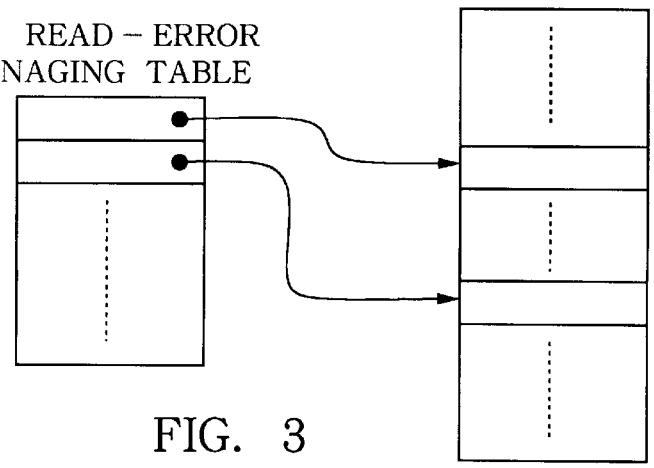
FIG. 3 is a diagram showing relationship between a read buffer and a read-error managing table in the CD-R drive device.

FIG. 2 is a flowchart showing typical behavior of the system controller 3 of FIG. 1 during the successive data readout operation in the CD-R drive device. First, at step S1, the system controller 3 reads out data from a block within a designated range. If the read block is found a non-error block as a result of the error detection/correction that is performed via the encoder 5 based on the ECC/EDC (step S2), the system controller 3 reads a next block at step S6. If the read block is a non-correctable error block as determined at step S2, then a further determination is made at step S3 as to whether the block is a link block. This determination can be made such as by predicting the address of a link block occurring for every packet or by referring to a header field of the block. If the error block is a link block, the block is registered in the read-error managing table 14 at step S4, and then the system controller 3 reads the next block (steps S6 and S1). If the error block is not a link block, the system controller 3 invalidates the read block and terminates the data readout operation at step S5.

By the above-mentioned successive data readout operation, the read-error managing table 14 can store a pointer indicative of the position, in the read buffer 13, of each of the blocks which has been found to be an error block.

Figure 4:
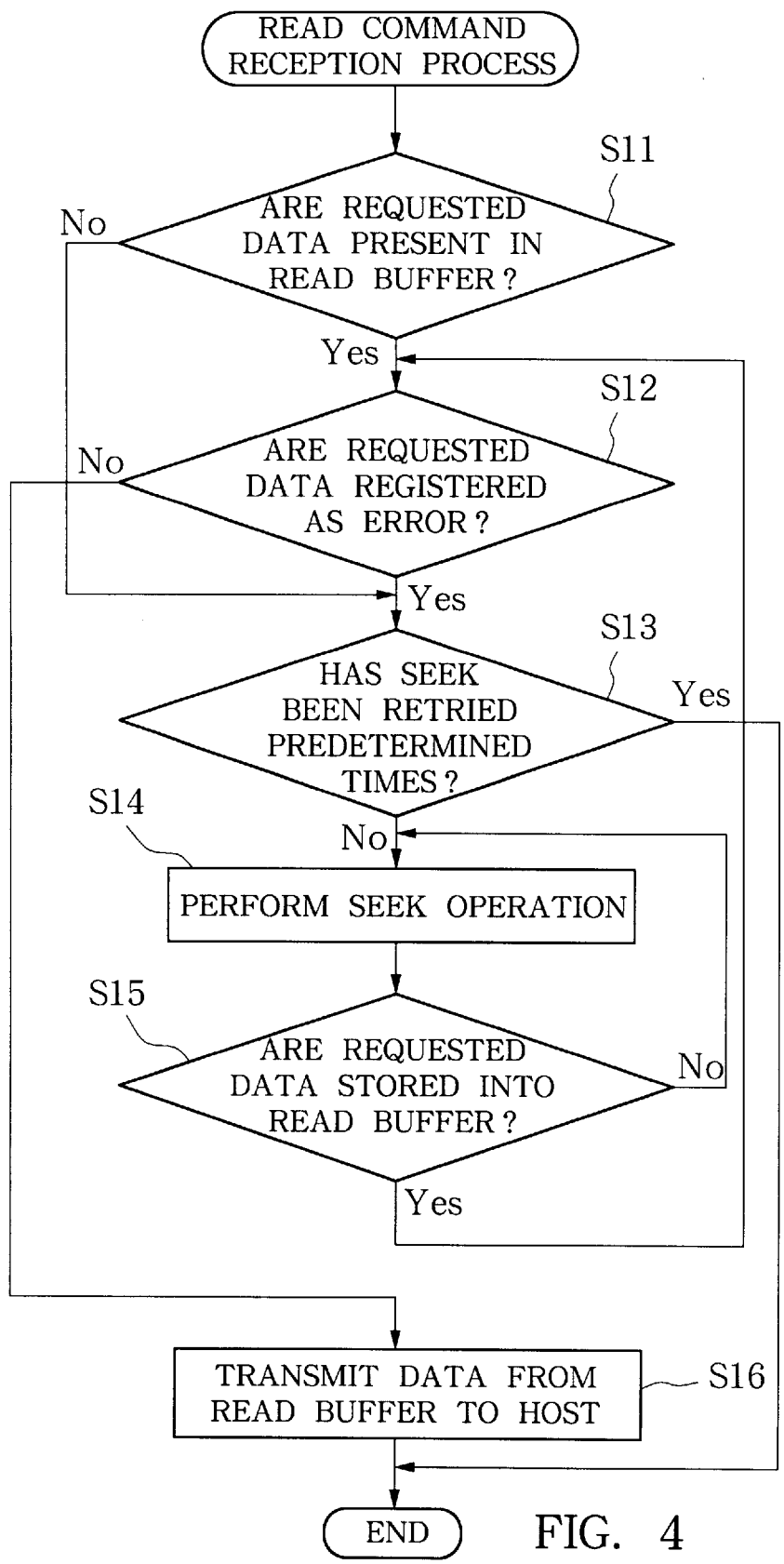
FIG. 4 is a flowchart showing a process performed by the CD-R drive device when a host computer requests data readout.
Figure 5:
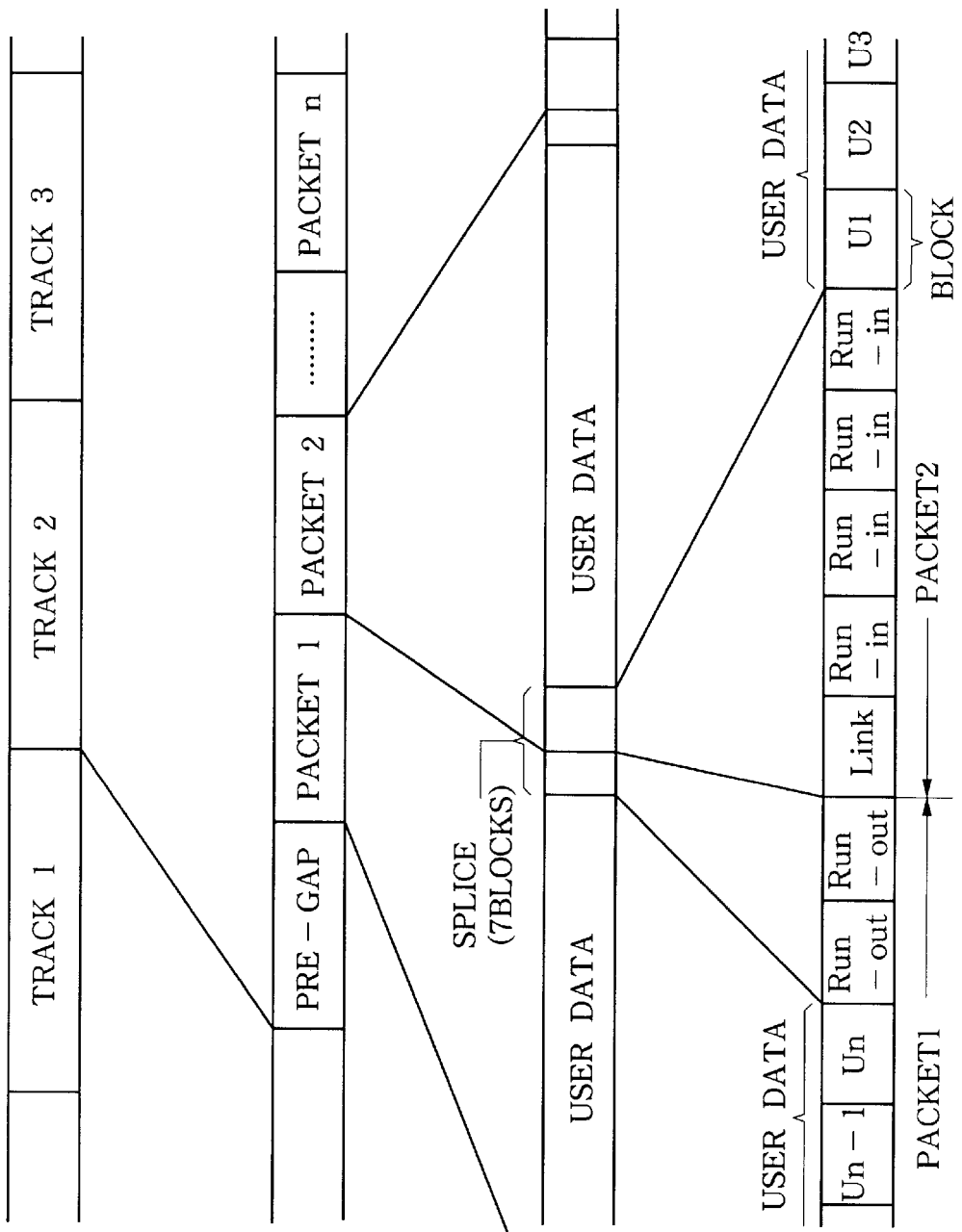
FIG. 5 is a diagram showing a packet-write recording format on a CD-R.

FIG. 4 is a flowchart of a read-command reception process performed by the system controller 3 when it receives a read command from the host computer. Upon receipt of the read command, the system controller 3 ascertains at step S1 whether the requested data are present in the read buffer 13. At an initial stage, the read buffer 13 is empty, so that the system controller 3 carries out a seek operation at step S14 to conduct the above-mentioned successive data readout operation and waits until the requested data have been stored in the read buffer 13 at step S15. Once the requested data have been stored in the read buffer 13, the system controller 3 transmits the data stored in the buffer 13 to the host computer at step S16.

Even after the requested data are transmitted to the host computer, the data readout operation is continued until the read buffer 13 reaches a buffer-full condition. This continuation constitutes advance data readout in preparation of a subsequent read command from the host computer. This way, the successive data readout operation including the advance data readout is carried out. Then, in response to a read command from the host computer after the advance data readout, the system controller 3 ascertains at step S11 whether the requested data are present in the read buffer 13. If so, a determination is further made at step S12 as to whether the data are registered as error data in the read-error managing table 14. If the data are not registered as error data, then the system controller 3 proceeds to read out the requested data from the read buffer 13 and transmits the read-out data to the host computer via the interface 1 at step S16.

By the above-mentioned advance data readout, link blocks found to be error blocks can be stored into the read buffer 13 at fixed intervals; however, in most cases, data of the link blocks are not actually read since the host computer knows every data from the start to end of each packet. This prevents erroneous data from being read out to the host computer.

But, the host computer may issue a request to directly read such an error block when it desires advance data readout at an OS (Operating System)-level or inspection of the optical disc. In such a case, i.e., where the requested data are registered in the read error managing table 14 as determined at step S12, the seek operation is repeated at step S14 predetermined times, upon which the system controller 3 terminates the process at step S13. This prevents erroneous data from being read out. The reason why the seek operation is repeated at step S14 is that only one error-block determination might yield an erroneous determination result.

In summary, the present invention is characterized in that even when a non-correctable error occurs during advance data readout into the data buffer, the advance data readout is continued as long as the data block is a link block between packets. This arrangement avoids degradation in reading performance and prevents erroneous data from being supplied to the outside because the external host computer does not read data between packets in normal operations.

What is claimed is:

1. An optical disc reading device comprising:

a data reading section that successively reads out data from an optical disc where the data are recorded on a packet-by-packet basis in such a manner that a link block is formed as a written-data gap between every adjoining packets, each of the packets being of a predetermined data length and including a plurality of blocks;

a decoding section that decodes the data read out from the optical disc and performs an error detecting and correcting operation on each of the blocks;

a data buffer that sequentially stores each of the blocks decoded and subjected to the error detecting and correcting operation by said decoding section; and a control section that, when a non-correctable error is found in a specific one of the brocks stored in said data buffer, controls said data reading section to continue successively reading out the data from the optical disc if the specific block having the non-correctable error is a link block, but invalidates the specific block and controls said data reading section to stop successively reading out the data from the optical disc if the specific block is not a link block.

2. An optical disc reading device as defined in claim 1 which further comprises a read-error managing table to manage a stored position, in said data buffer, of the specific block having the non-correctable error.

3. An optical disc reading device as defined in claim 2 wherein when a data readout request is received from outside said optical disc reading device, said control section refers to said read-error managing table so as to prevent said data reading section from reading out the specific block.

* * * * *